United States Patent
Whitens et al.

(10) Patent No.: US 8,215,684 B2
(45) Date of Patent: Jul. 10, 2012

(54) VEHICLE STOWAGE ASSEMBLY HAVING ELECTROMAGNETIC CLOSURE

(75) Inventors: Michael J. Whitens, Novi, MI (US); Jeff Webb, Plymouth, MI (US); Gary D. Mullen, Farmington, MI (US); Scott A. Clark, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 12/690,354

(22) Filed: Jan. 20, 2010

(65) Prior Publication Data

US 2011/0175376 A1 Jul. 21, 2011

(51) Int. Cl.
*E05C 17/56* (2006.01)
*E05C 19/16* (2006.01)

(52) U.S. Cl. ............ 292/251.5; 292/DIG. 65; 296/37.12

(58) Field of Classification Search ............... 292/251.5, 292/DIG. 65; 296/37.12; 70/276
See application file for complete search history.

(56) References Cited

U.S. PATENT DOCUMENTS

| | | | |
|---|---|---|---|
| 2,565,891 A | 8/1951 | Sherman | |
| 2,584,480 A | 2/1952 | Manting | |
| RE23,636 E | 3/1953 | Mark et al. | |
| 2,791,346 A | 5/1957 | Tell | |
| 3,312,492 A | 4/1967 | Remhof | |
| 3,468,576 A | 9/1969 | Beyer et al. | |
| 3,620,560 A | 11/1971 | Peters | |
| 3,635,511 A | 1/1972 | Waller | |
| 3,647,165 A | 3/1972 | Whitla | |
| 3,790,197 A | 2/1974 | Parker | |
| 3,831,986 A | 8/1974 | Kobayashi | |
| 4,428,607 A | 1/1984 | Levine | |
| 4,552,399 A | 11/1985 | Atarashi | |
| 4,743,060 A | 5/1988 | Hishida | |
| 4,802,350 A | 2/1989 | Periou | |
| 5,143,265 A | 9/1992 | Schultz | |
| 5,386,636 A | 2/1995 | Asano | |
| 5,388,901 A | 2/1995 | Asano | |
| 5,864,274 A * | 1/1999 | Steingroever et al. | 335/234 |
| 6,039,345 A * | 3/2000 | Cech et al. | 280/735 |
| 6,765,330 B2 * | 7/2004 | Baur | 310/103 |
| 6,802,550 B1 | 10/2004 | Griggs, Jr. et al. | |
| 7,121,605 B2 | 10/2006 | DePue et al. | |
| 7,240,941 B2 | 7/2007 | Adams et al. | |
| 7,287,785 B2 * | 10/2007 | Schupp et al. | 292/216 |

(Continued)

FOREIGN PATENT DOCUMENTS

EP 0561332 A1 9/1993

(Continued)

*Primary Examiner* — Carlos Lugo
(74) *Attorney, Agent, or Firm* — Gregory P. Brown; Price Heneveld LLP

(57) ABSTRACT

A vehicle stowage assembly is provided that includes a compartment having an opening to allow access to the opening and a door proximate the opening. A ferrous member magnets are disposed on the compartment and the door to magnetically couple the magnets to the ferrous member when the door is in the closed position. A crash sensor is provided for detecting an expected vehicle crash event. An electromagnetic coil electromagnetically is coupled to the ferrous member, wherein the coil is electrically energized by current to create a polarity on the ferrous bar to create an increased force closure to the door relative to the housing when an expected vehicle crash is detected. The coil generates an opposite polarity on the ferrous member to open the door in response to a user actuated input.

18 Claims, 4 Drawing Sheets

U.S. PATENT DOCUMENTS

| | | |
|---|---|---|
| 7,500,704 B2 | 3/2009 | Herrera et al. |
| 7,571,948 B2 | 8/2009 | Suh |
| 7,583,500 B2 | 9/2009 | Ligtenberg et al. |
| 7,815,232 B2 * | 10/2010 | Henry et al. ............... 292/251.5 |
| 2004/0201238 A1 | 10/2004 | Griggs, Jr. et al. |
| 2005/0156417 A1 * | 7/2005 | Breed et al. ................. 280/734 |
| 2005/0242555 A1 * | 11/2005 | Breed et al. ................. 280/735 |
| 2006/0145485 A1 | 7/2006 | Hapke |
| 2007/0040363 A1 * | 2/2007 | Breed et al. ................. 280/730.2 |
| 2008/0174127 A1 * | 7/2008 | Kim et al. ................... 292/251.5 |
| 2008/0265588 A1 | 10/2008 | Carabalona |
| 2009/0224558 A1 | 9/2009 | Ickenroth |

FOREIGN PATENT DOCUMENTS

| | | |
|---|---|---|
| JP | 4185880 A | 7/1992 |

\* cited by examiner

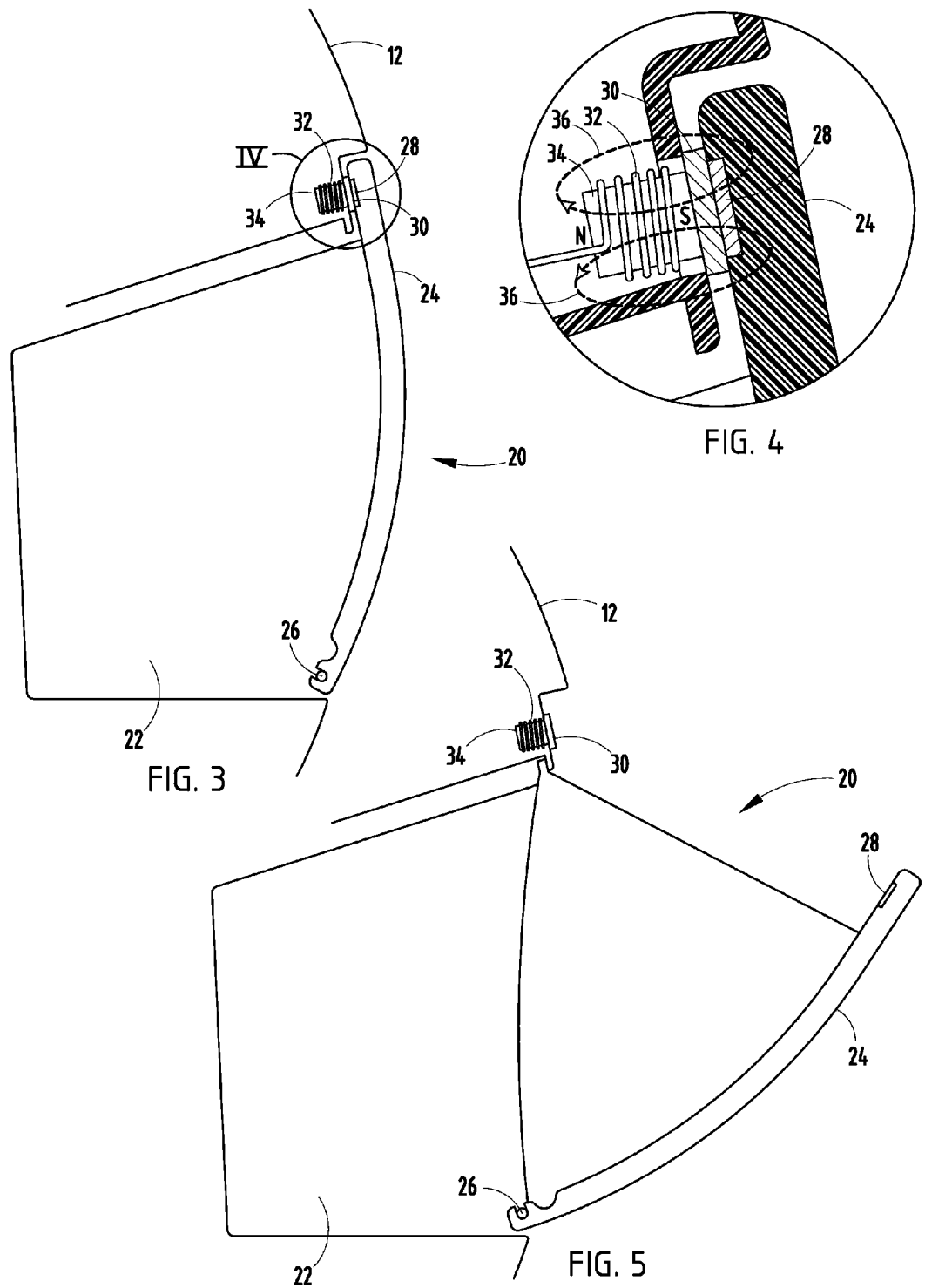

VEHICLE STOWAGE ASSEMBLY HAVING ELECTROMAGNETIC CLOSURE

FIELD OF THE INVENTION

The present invention generally relates to vehicle storage compartments, and more particularly relates to a storage compartment closure assembly for controlling latching of a closure member on a vehicle.

BACKGROUND OF THE INVENTION

Automotive vehicles are commonly equipped with various compartments for stowing vehicle accessories, personal belongings and other objects. For example, vehicles typically include a glove box usually located in the dash on the front passenger side of the passenger compartment. The glove box has a housing typically installed with the dash and has walls that generally define a compartment with an open front side. A pivoting lid or door is pivotally connected to the housing such that the lid pivots between an open position in which the compartment is accessible and a closed position in which access is prevented. The door typically has a latch assembly for latching the door closed and is user actuatable to release the door and allow it to first open. A conventional latch may include a pull level that releases a latch and enables a user to pull the door open. Conventional latch mechanisms may be susceptible to damage, particularly when large forces are applied such as during a vehicle collision which can result in unwanted exodus of objects from the compartment.

It is desirable to provide for alternative closure assemblies for vehicle compartments that are easy to use and adequately operate the door between open and closed positions.

SUMMARY OF THE INVENTION

According to one aspect of the present invention, a vehicle stowage assembly is provided. The vehicle stowage assembly includes a storage compartment comprising an opening to permit access to the compartment, and a door proximate the opening. The stowage assembly also includes a ferrous member, and one or more magnets magnetically coupled to the ferrous member when the door is closed. The stowage assembly further includes a coil electromagnetically coupled to the ferrous member when electrically energized to create a polarity on the ferrous member to apply an increased closure force to the door.

According to another aspect of the present invention, a vehicle stowage assembly is provided that includes a compartment comprising an opening to permit access to the compartment, and a door proximate to the opening The stowage assembly also includes a ferrous member, a crash sensor for, detecting a vehicle crash event. The stowage assembly further includes a coil coupled to the ferrous member and electrically energized to create a polarity on the ferrous bar to apply a closure force to the door relative to the compartment when a vehicle crash is detected.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 3 is a side view of the stowage assembly with the door shown in the closed position;

FIG. 4 is an enlarged sectional view of section IV of FIG. 3 showing the coil and ferrous member oriented according to a first embodiment;

FIG. 5 is a side view of the stowage assembly with the door shown in the open position;

DETAILED DESCRIPTION OF PREFERRED EMBODIMENTS

Figure 1:
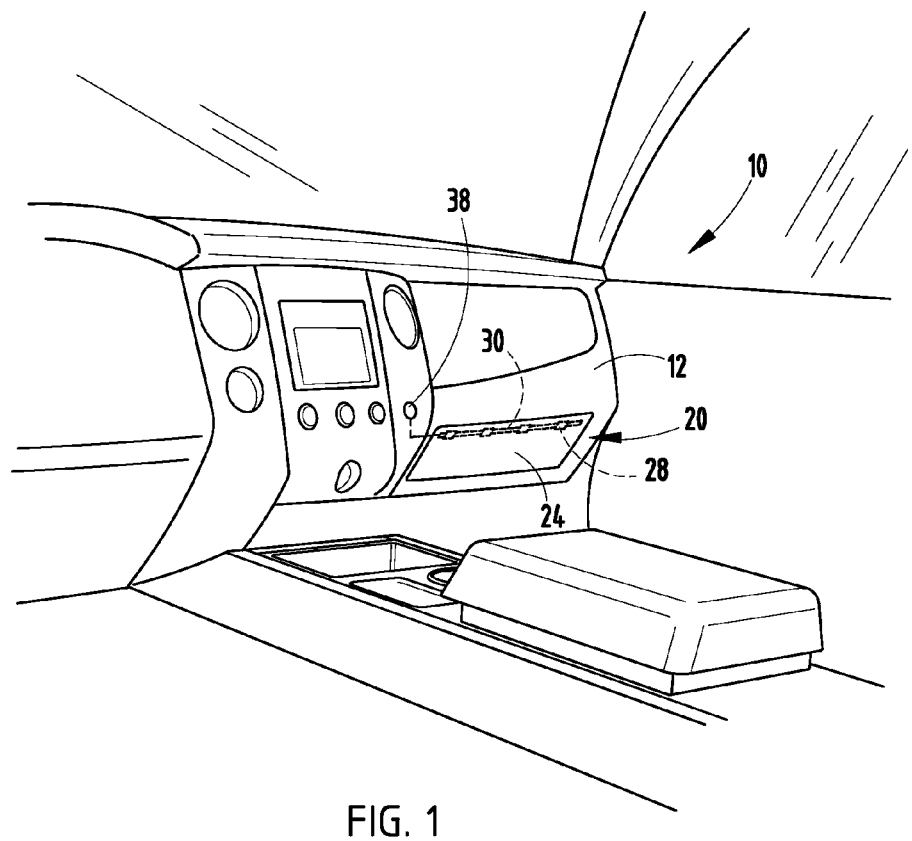
FIG. 1 is a perspective view of a vehicle passenger compartment equipped with a stowage assembly having an electromagnetic closure, according to one embodiment.
Figure 2:
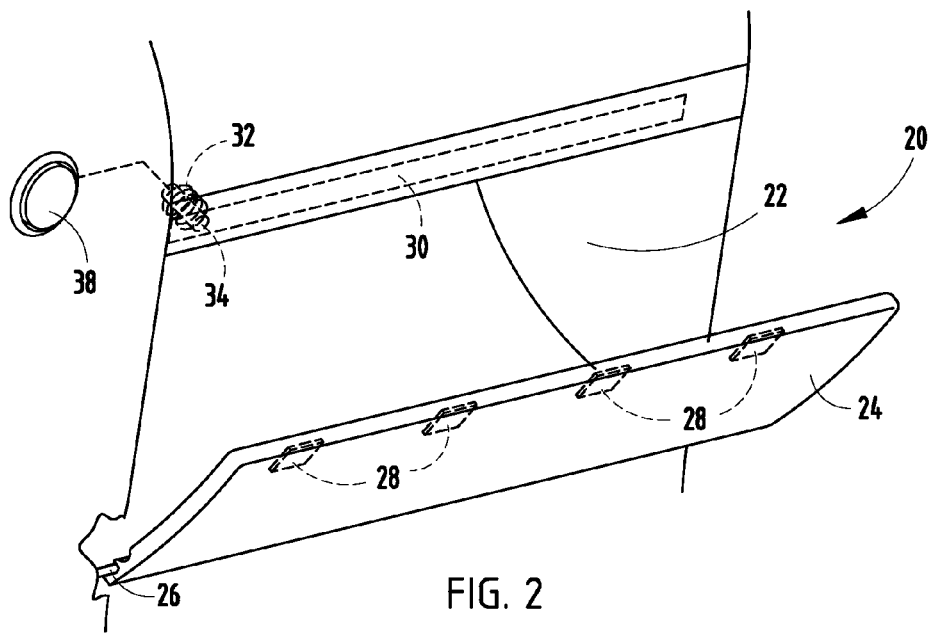
FIG. 2 is an enlarged perspective view of the stowage assembly shown in FIG. 1 with the door open.

Referring to FIG. 1, the passenger compartment of an automotive vehicle 10 is generally illustrated having a storage assembly 20 generally installed within the dash 12 of the vehicle 10, generally forward of the passenger side of the vehicle compartment. The storage assembly 20 is commonly referred to as a glove compartment generally made available for storing items inside of the vehicle 10. The stowage assembly 20 employs an electromagnetic closure according to the embodiment shown. While a glove compartment is generally illustrated as the stowage assembly 20, it should be appreciated that the electromagnetic closure may be employed on other stowage assemblies, such as the center console storage bin and other compartments that have a door that controls access to the compartment.

Referring to FIGS. 2-5, the vehicle stowage assembly 20 is generally illustrated having a storage compartment 22 and an opening to permit access to the compartment 22. The compartment 22 generally has walls (bottom, sides and back) that define the size and shape of the storage compartment. The assembly 20 also has a door 24 proximate to the opening to allow access to the opening and to close the opening. The door 24 is pivotally connected to the housing via hinge 26 to allow the door 24 to pivot between the open position shown in FIGS. 2 and 5 and the closed position shown in FIG. 3.

The vehicle stowage assembly 20 includes a ferrous member 30 extending on one of the compartment 22 and the door 24. In the embodiment shown, the ferrous member 30 is located on the compartment 22 near the top edge. The ferrous member 30 is fixed to the compartment 22 such that it does not move in this embodiment. The ferrous member may include a steel member, such as a steel bar, according to one embodiment. According to another embodiment, the ferrous member may include a soft iron material, such as an iron bar. A soft iron material may be magnetized when current is applied thereto, and loses its magnetism when the electrical current stops flowing, whereas a steel material may form a more permanent magnet, which could be reversed.

The vehicle stowage assembly 20 also includes one or more magnets 28 disposed on the other of the door 24 and compartment 22 and adapted to magnetically coupled to the ferrous member 30 when the door 24 is in the closed position. In the embodiment shown, four rare earth magnets 28 are assembled to the door 24 near the top edge such that the magnets align with the ferrous member 30. When the door 24 is in the closed position, the magnets 28 attract to ferrous member 30 so as to hold the door 24 with a closure force when in the closed position during normal vehicle operation.

The vehicle stowage assembly 20 further includes an electromagnetic coil 32 located and aligned to be electromagnetically coupled to the ferrous member 30. The coil 32 is electrically energized by current to create a polarity on the ferrous member 30 to apply an added closure force to the door 24 relative to the compartment 22 which may occur during a sensed vehicle collision. As seen in FIGS. 3 and 4, the electromagnetic coil 32 is shown having a plurality of turns wrapped around a cylindrical core 34. When electrical current is applied to the coil terminals, an electromagnetic field 36 is generated as shown in FIG. 4. When electrical current is applied to the coil 32 in a first direction, a first electromagnetic field 36 is generated causing a first polarity on the ferrous member 30. For example, current in a first direction may generate a south polarity S on one end of the ferrous member 30. When the electrical current is reversed in an opposite sensed direction on coil 32, the electromagnetic field 36 is in the opposite direction, such that an opposite second polarity is generated on the ferrous member 30. In this embodiment, a north polarity N may be generated on ferrous member 30. The amount of polarity generated at ferrous member 30 may depend upon the amount of current applied to the coil 32 and the number of turns of coil 32. While a single coil 32 is illustrated herein, it should be appreciated that a plurality of electromagnetic coils may be employed according to other embodiments.

During a normal vehicle operation, the rare earth magnets 28 attract to ferrous member 30 to apply a closure force to hold the door 24 in the closed position relative to compartment 22. To open the door, a user may actuate a user input, such as a pushbutton switch 38 shown mounted in dash 12, which causes current to be applied to coil 32 in the second direction to generate a polarity that is the same as the polarity as the engaging surface of magnets 28 so that the magnets 28 are repelled by ferrous member 30 to cause the door 24 to be forced open. The door 24 may then be actuated manually (lifted and pushed inward) by a user to close the door 24. With the door 24 in the closed position, the stowage assembly 20 advantageously senses a vehicle crash or collision by monitoring one or more crash sensors and provides an increased force to maintain the door 24 in the closed position during a vehicle collision. This is achieved by applying electrical current to the coil 32 in the first direction so as to create a polarity of sufficient amplitude on the ferrous member 30 to increase the attractive force between the magnets 28 and ferrous member 30. This increased attractive closure force is intended to keep the door 24 in the closed position. While at least one crash sensor is used to sense a vehicle crash or collision, it should be appreciated that the crash indicative signal could be provided by way of a hard wired restraint control module which, in turn, receives the crash indicative signal.

Figure 6:
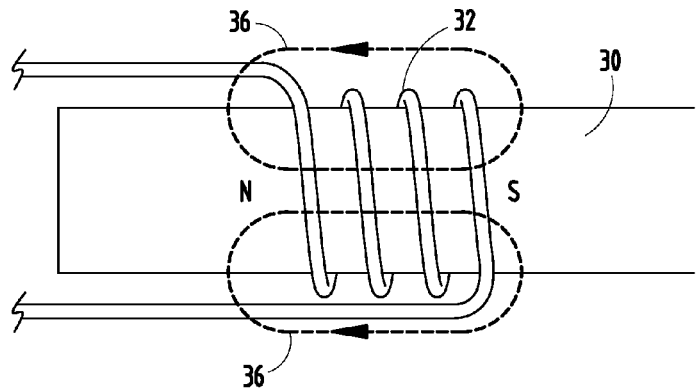
FIG. 6 is a partial side view of a coil and ferrous member shown oriented according to another embodiment.

Referring to FIG. 6, the coil 32 is shown oriented relative to the ferrous member 30, according to a second alternative embodiment. In this embodiment, the coil 32 is wrapped with turns around the ferrous member 30 near one end of ferrous member 30 such that the ferrous member 30 extends into the coil 32. The coil 32 generates a magnetic field 36 which creates a polarity to one side of the coil 32, and the polarity depends upon the direction of current flow.

Figure 7:
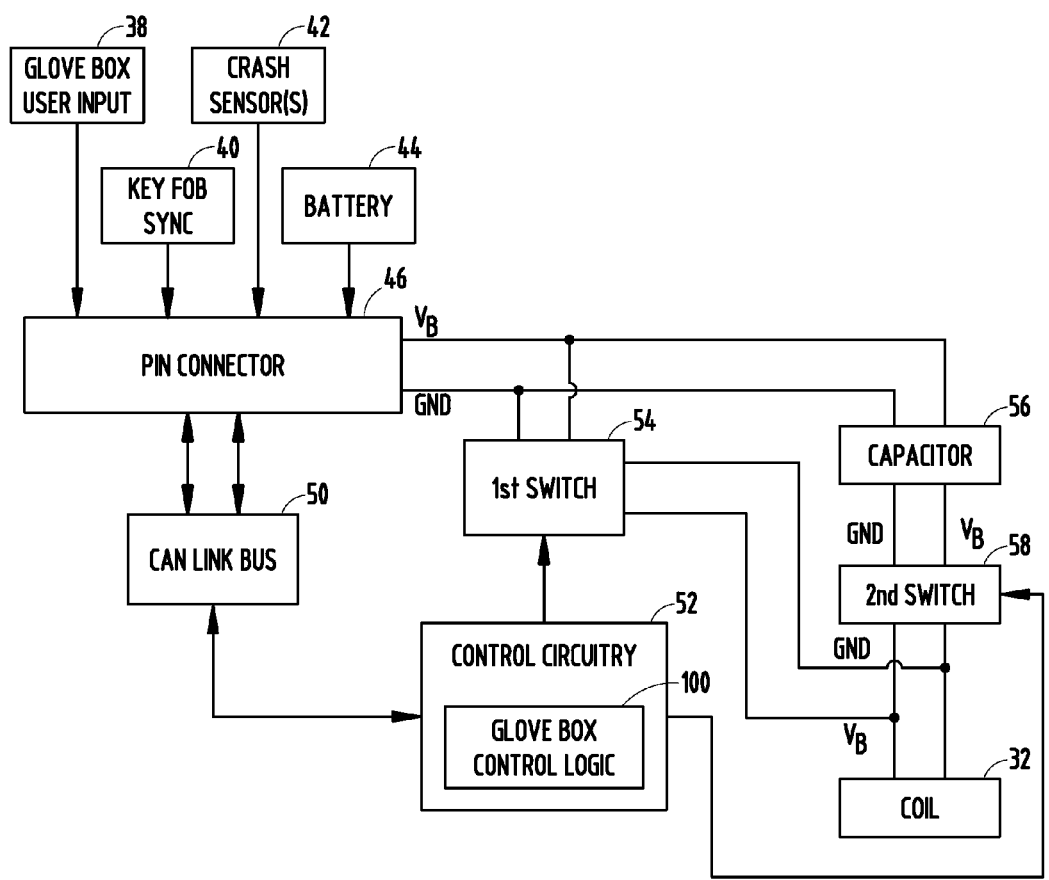
FIG. 7 is a block diagram illustrating a control circuit arrangement for controlling opening and closing of the door.

Referring to FIG. 7, the vehicle stowage assembly 20 is further illustrated having a pin connector 46 receiving various inputs including a glove box user input 38, a key fob sync input 40, crash sensor(s) 42 and a battery 44. The pin connector 46 is in communication with a controller area network (CAN) link bus 50. The CAN link bus 50, in turn, is in communication with control circuitry 52 which includes glove box control logic 100. The battery 48 may include a 12-volt vehicle battery that supplies a voltage and ground lines via pin connector 46 as voltage $V_B$ and ground GND. The voltage $V_B$ and ground is supplied to an energy storage device shown as a capacitor 56 which stores electrical energy. A first switch 54 is shown connected between voltage $V_B$ and ground GND and the coil 32 and controls the application of electrical current to coil 32 in the second direction when a user actuates the door open pushbutton 38. A second switch 58 is connected between capacitor 56 and coil 32 and controls the application of stored electrical energy from capacitor 56 to coil 32 when a crash event is detected so as to apply electrical current in the first direction to provide added closure force to keep the door 24 in the closed position during a detected vehicle crash event. The capacitor 56 advantageously stores electrical energy which is available during the crash event. The control circuitry 52 advantageously controls the first and second switches 54 and 58 based upon the inputs 38, 40 and 42 by processing the glove box control logic 100. Control circuitry 52 controls the first switch 54 in response to the user actuating the glove box user input 38 or a key fob sync 40 whenever a user wants to open the stowage compartment. It should be appreciated that other further remote devices may be monitored employed to open the door 24. The control circuitry monitors one or more crash sensors 42 and controls the second switch 58 to hold the door in the closed position when a vehicle crash event is detected.

Figure 8:
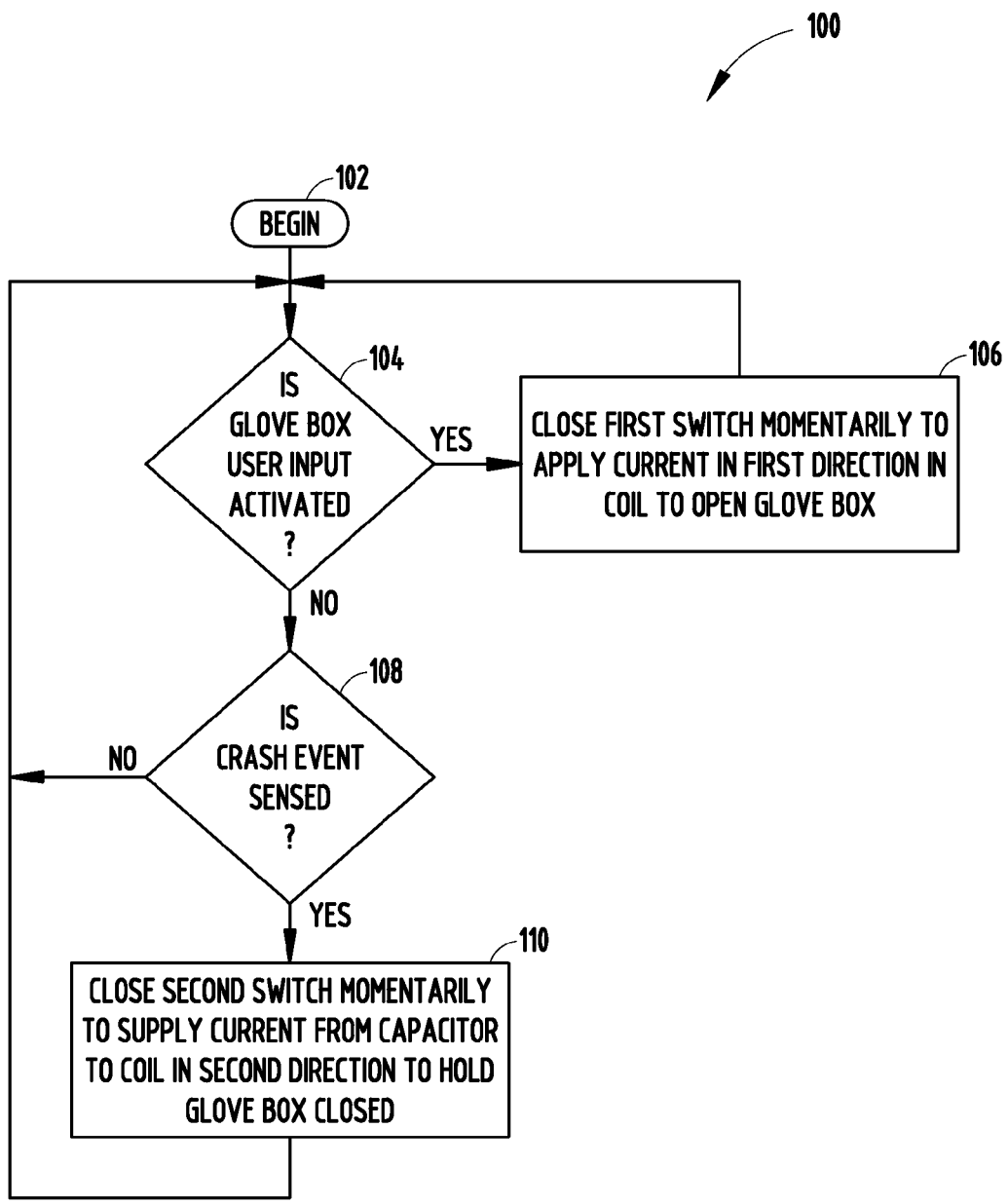
FIG. 8 is a flow diagram illustrating a method of controlling the electromagnetic coil to open the stowage assembly and to retain the door closed during a vehicle collision.

Referring to FIG. 8, the glove box control logic 100 is illustrated according to one embodiment. Logic 100 begins at step 102 and proceeds to decision step 104 to determine if the glove box user input is activated. If the glove box user input is activated, routine 100 proceeds to step 106 to close the first switch momentarily to apply current in the first direction in the coil to open the glove box and then returns to step 104. The first switch may close for a short time such as less than one second sufficient to open the door and then reopens thereafter. If the glove box user input has not been activated, routine 100 proceeds to decision 108 to determine if a crash event has been sensed. If a crash event has been sensed, routine 100 proceeds to step 110 to close the second switch momentarily to supply current from the capacitor to the coil in the second direction to hold the glove box in the closed position. The second switch may close shortly for less than five seconds sufficient to outlast forces experienced during a collision and may then reopen thereafter. Thereafter, or if no crash event is detected, routine 100 returns to step 104. Accordingly, routine 100 advantageously controls the application of current in first and second opposite directions to either repel and force the door open when a user so desires or to force the door further closed during an accident according to various sensed inputs.

Accordingly, the vehicle stowage assembly 20 advantageously provides for an easy to use assembly that adequately operates the door 24 of the storage assembly 20 between the open and closed positions.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle stowage assembly comprising:
 a storage compartment comprising an opening to permit access to the compartment;
 a door pivotally mounted to the compartment proximate the opening;

a ferrous member positioned on one of the storage compartment and the door;

one or more magnets positioned on the other one of the storage compartment and the door, the one or more magnets being magnetically coupled to the ferrous member to apply a closure force when the door is closed;

a coil electromagnetically coupled to the ferrous member;

a user input operatively coupled to the magnetic coupling between the one or more magnets and the ferrous member and adapted to disengage the magnetic coupling and open the door; and a detector to detect an event so that the coil is electrically energized to create a polarity on the ferrous member to apply an increased closure force to the door to maintain the door closed during the event.

2. The assembly as defined in claim 1, wherein the detector comprises a crash sensor for detecting an expected vehicle crash event, wherein the coil is energized with current in a first direction in response to the crash sensor such that the increased closure force to the door is applied during an expected vehicle crash.

3. The assembly as defined in claim 2 further comprising an energy storage device for storing electrical energy, wherein the energy storage device supplies the energy in response to a crash sensor signal so as to apply current to the coil to apply the added closure force.

4. The assembly as defined in claim 3, wherein the energy storage device comprises a capacitor holding a voltage potential that is discharged in response to the crash sensor signal.

5. The assembly as defined in claim 1, wherein the coil is energized with current in an opposite direction in response to the user input to create an opposite polarity on the ferrous member to repel the door relative to the compartment to open the door.

6. The assembly as defined in claim 5, wherein the user input comprises a fob.

7. The assembly as defined in claim 5, wherein the user input comprises a user actuated switch located remote from the door.

8. The assembly as defined in claim 1, wherein the door is pivotally connected to the compartment by way of a hinge.

9. The assembly as defined in claim 8, wherein the one or more magnets are located in the door at an end opposite the hinge.

10. The assembly as defined in claim 1, wherein the one or more magnets are located in the door and the ferrous member is located in the compartment.

11. A vehicle stowage assembly comprising:

a compartment comprising an opening to permit access to the compartment;

a door pivotally mounted to the compartment proximate to the opening;

a ferrous member positioned on one of the storage compartment and the door;

one or more magnets positioned on the other one of the storage compartment and the door, the one or more magnets being magnetically coupled to the ferrous member;

a crash sensor detecting a vehicle crash event;

a coil coupled to the ferrous member and electrically energized to create a polarity on the ferrous member to apply a closure force to the door relative to the compartment when a vehicle crash event is detected; and an input operatively coupled to the magnetic coupling between the one or more magnets and the ferrous member, and adapted to disengage the magnetic coupling to open the door.

12. The assembly as defined in claim 11, wherein the one or more magnets are adapted to magnetically couple to the ferrous member when the door is in the closed position.

13. The assembly as defined in claim 11, wherein the coil is energized with current in an opposite direction so as to create an opposite polarity on the ferrous member to repel the door relative to the compartment to open the door.

14. The assembly as defined in claim 13, wherein the user input comprises a user actuated switch located remote from the door.

15. The assembly as defined in claim 14, wherein the user input comprises a fob.

16. The assembly as defined in claim 11 further comprising an energy storage device for storing electrical energy, wherein the energy storage device supplies the stored energy in response to the crash sensor signal so as to apply current to the coil to apply the closure force.

17. The assembly as defined in claim 16, wherein the energy storage device comprises a capacitor that is discharged in response to the crash sensor signal.

18. A vehicle storage compartment comprising:

a compartment having an open space;

a door pivotally mounted to the compartment and capable of allowing or restricting access to the open space;

a ferrous member positioned on one of the compartment and the door;

at least one magnet positioned on the other one of the compartment and the door, the at least one magnet being magnetically coupled to the ferrous member;

a user input operatively coupled to the magnetic coupling between the at least one magnet and the ferrous member, and configured to disengage the magnetic coupling and allow opening of the door;

a detector to detect an event; and a coil being electromagnetically coupled to the ferrous member and electrically energizeable to create a polarity on the ferrous member to apply an increased closure force to the door.

* * * * *